US009666365B2

(12) United States Patent
Nishiyama

(10) Patent No.: US 9,666,365 B2
(45) Date of Patent: May 30, 2017

(54) LAMINATED FILM CAPACITOR, FILM CAPACITOR MODULE, AND POWER CONVERSION SYSTEM

(71) Applicant: MURATA MANUFACTURING CO., LTD., Nagaokakyo-shi, Kyoto-fu (JP)

(72) Inventor: Shigeki Nishiyama, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 231 days.

(21) Appl. No.: 14/631,516

(22) Filed: Feb. 25, 2015

(65) Prior Publication Data

US 2015/0255212 A1     Sep. 10, 2015

(30) Foreign Application Priority Data

Mar. 7, 2014    (JP) .................... 2014-045701

(51) Int. Cl.
| | |
|---|---|
| *H01G 2/08* | (2006.01) |
| *H01G 4/015* | (2006.01) |
| *H01G 4/30* | (2006.01) |
| *H01G 4/012* | (2006.01) |
| *H01G 4/12* | (2006.01) |
| *H02M 7/00* | (2006.01) |

(52) U.S. Cl.
CPC ............ *H01G 2/08* (2013.01); *H01G 4/015* (2013.01); *H01G 4/30* (2013.01); *H01G 4/012* (2013.01); *H01G 4/12* (2013.01); *H02M 7/003* (2013.01)

(58) Field of Classification Search
CPC   H01G 2/08; H01G 4/015; H01G 4/30; H01G 4/012; H01G 4/12; H02M 7/003

USPC ...................................... 361/274.1
See application file for complete search history.

(56) References Cited

U.S. PATENT DOCUMENTS

2004/0207972 A1* 10/2004 Kazama ............... H01G 2/08
                                                          361/321.2
2013/0314839 A1* 11/2013 Terashima ........... H01G 4/306
                                                          361/301.4

FOREIGN PATENT DOCUMENTS

| JP | H06231998 A | 8/1994 |
| JP | 2003-59752 A | 2/2003 |
| JP | 2005191462 A | * 7/2005 |
| JP | 2005191462 A | 7/2005 |
| JP | 2005-251940 A | 9/2005 |
| JP | 2098-211128 A | 9/2008 |
| JP | 2008-300502 A | 12/2008 |
| JP | 2008-300600 A | 12/2008 |
| JP | 2008-311253 A | 12/2008 |
| JP | 2012-099712 A | 5/2012 |

(Continued)

*Primary Examiner* — Eric Thomas
*Assistant Examiner* — Michael P McFadden
(74) *Attorney, Agent, or Firm* — Arent Fox LLP

(57) ABSTRACT

A laminated film capacitor that includes a laminated body of first capacitance electrodes and second capacitance electrodes stacked to be opposed to each other with dielectric films interposed therebetween. A first external electrode is electrically connected to the first capacitance electrodes and a second external electrode is electrically connected to the second capacitance electrodes. The laminated film capacitor includes heat dissipators that are connected to the external electrodes, and higher in heat dissipation performance than at least one of the first capacitance electrodes and second capacitance electrodes. The heat dissipators are larger in thickness than at least one of the first capacitance electrodes and second capacitance electrodes.

18 Claims, 12 Drawing Sheets

(56) References Cited

FOREIGN PATENT DOCUMENTS

| JP | 2013-038298 A | 2/2013 |
| JP | 2013-153115 A | 8/2013 |
| JP | 2013171995 A | 8/2013 |
| JP | 2013207211 A | 10/2013 |

* cited by examiner

LAMINATED FILM CAPACITOR, FILM CAPACITOR MODULE, AND POWER CONVERSION SYSTEM

BACKGROUND OF THE INVENTION

1. Field of the Invention

The present invention relates to a laminated film capacitor, a film capacitor module, and a power conversion system.

2. Description of the Related Art

Wound or laminated film capacitors are composed of stacked multiple layers of electrodes and films composed of a dielectric. In such film capacitors, heat may be generated by the electric current flowing through the electrodes, and the films constituting the dielectric may be shrunk by the heat. Therefore, film capacitors have been developer which are able to dissipate heat generated in the film capacitors.

JP 2013-153115 A discloses a film capacitor of wound or stacked films with a metallic film formed thereon, where the films contain therein a plate-like insulating filler which has heat dissipation performance.

JP 2012-99712 A discloses a film capacitor of stacked films with an aluminum film deposited thereon, where alumina is formed on end edges of the aluminum films, and heat is dissipated from the end edges of the aluminum films.

JP 2008-311253 A, JP 2008-300600 A, JP 2008-300502 A, and JP 2008-211128 A disclose film capacitors each including a wound core and films with metal deposited thereon, which are wound around the wound core, where heat is dissipated from the wound core. In the film capacitors in JP 2008-311253 A and JP 2008-211128 A, the wound core is connected to an electrode formed by metallikon on the outer periphery of the film capacitor, and formed from a metallic material. JP 2008-311253 A and JP 2008-211128 A disclose therein heat dissipation performance increased by this wound core. JP 2008-300600 A discloses the insertion of a cooling tube into the wound core for cooling the film capacitor with a refrigerant. JP 2008-300502 A discloses a heat dissipation fin provided on the inner periphery of the wound core.

JP 2003-59752 A discloses the formation of a comb-like terminal for the film capacitor, and heat dissipation from this comb-like terminal.

SUMMARY OF THE INVENTION

In the film capacitor in JP 2013-153115 A, the films constituting the dielectric contain therein the insulating filler, and there is thus a possibility that the electric field in the film capacitor will be disturbed, thereby resulting in decreased reliability of the film capacitor. Furthermore, in the film capacitor in JP 2012-99712 A, there is a possibility of low thermal conductivity, thus leading to insufficient heat dissipation performance, because the aluminum films are thin deposited films. In the film capacitors in JP 2008-311253 A, JP 2008-300600 A, JP 2008-300502 A, and JP 2008-211128 A, it is difficult to sufficiently dissipate heat in sections away from the wound core, although heat near the wound core is dissipated. Furthermore, in the film capacitor in JP 2003-59752 A, heat within the film capacitor is not sufficiently dissipated, although heat near the outer periphery is dissipated.

The present invention has been achieved in view of the circumstances mentioned above, and an object of the present invention is to provide a laminated film capacitor which has high reliability and excellent heat dissipation performance.

The laminated film capacitor according to a first aspect of the present invention is a laminated film capacitor including:

a laminated body of first capacitance electrodes and second capacitance electrodes stacked to be opposed to each other with first dielectric films interposed therebetween;

a first external electrode electrically connected to the first capacitance electrodes; and a second external electrode electrically connected to the second capacitance electrodes, wherein:

the laminated body includes a heat dissipator that is connected to one of the first external electrode and the second external electrode, and higher in heat dissipation performance than at least one of the first capacitance electrodes and the second capacitance electrodes; and the heat dissipator is larger in thickness than at least one of the first capacitance electrodes and the second capacitance electrodes.

The laminated film capacitor according to a second aspect of the present invention is a laminated film capacitor including:

a laminated body of first capacitance electrodes and second capacitance electrodes stacked to be opposed to each other with first dielectric films interposed therebetween;

a first external electrode electrically connected to the first capacitance electrodes; and a second external electrode electrically connected to the second capacitance electrodes, wherein:

the laminated body includes a heat dissipator that is connected to one of the first external electrode and the second external electrode, and higher in heat dissipation performance than at least one of the first capacitance electrodes and the second capacitance electrodes; and the heat dissipator is lower in thermal resistance than at least one of the first capacitance electrodes and the second capacitance electrodes.

The first capacitance electrode and the second capacitance electrode are formed from, for example, a deposited film of metal.

The heat dissipator is, for example, opposed to the second capacitance electrode with a second dielectric film interposed therebetween, and connected to the second capacitance electrode.

The heat dissipator is, for example, opposed to the second capacitance electrode with a second dielectric film interposed therebetween, configured by a conductor, and connected to the first capacitance electrode.

The first external electrode and the second external electrode may be formed by metallikon.

Furthermore, a film capacitor module according to a third aspect of the present invention includes:

the laminated film capacitor described above; and a connection electrode connected to at least one of the first external electrode and the second external electrode, and connected to an external circuit.

The power conversion system according to a fourth aspect of the present invention is:

a power conversion system that converts one of direct-current power and alternating-current power to the other, wherein:

at least one of the laminated film capacitor and film capacitor module described above is used as a smoothing capacitor for reducing surge superimposed on a direct-current voltage.

According to the present invention, the placement of the heat dissipator provides a laminated film capacitor which has high reliability and excellent heat dissipation performance.

DETAILED DESCRIPTION OF THE INVENTION

Embodiments of the present invention will be described below in detail with reference to the drawings. It is to be noted that the same or like parts are denoted by the same symbols in the figures. The orthogonal coordinates where the stacking direction of metallized films of a film capacitor is regarded as a Z direction, and the longer direction and shorter direction of the metallized films are respectively regarded as a Y direction and an X direction are constructed, and will be hereinafter referenced appropriately.

Embodiment 1

Figure 1:
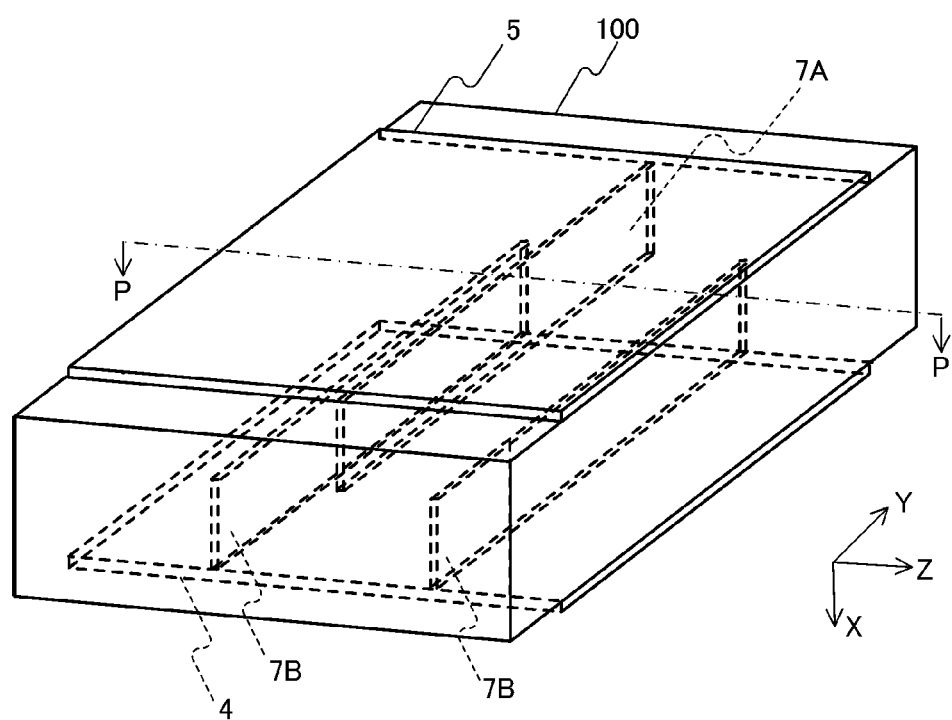
FIG. 1 is a perspective view illustrating a film capacitor according to Embodiment 1 of the present invention.
Figure 2:
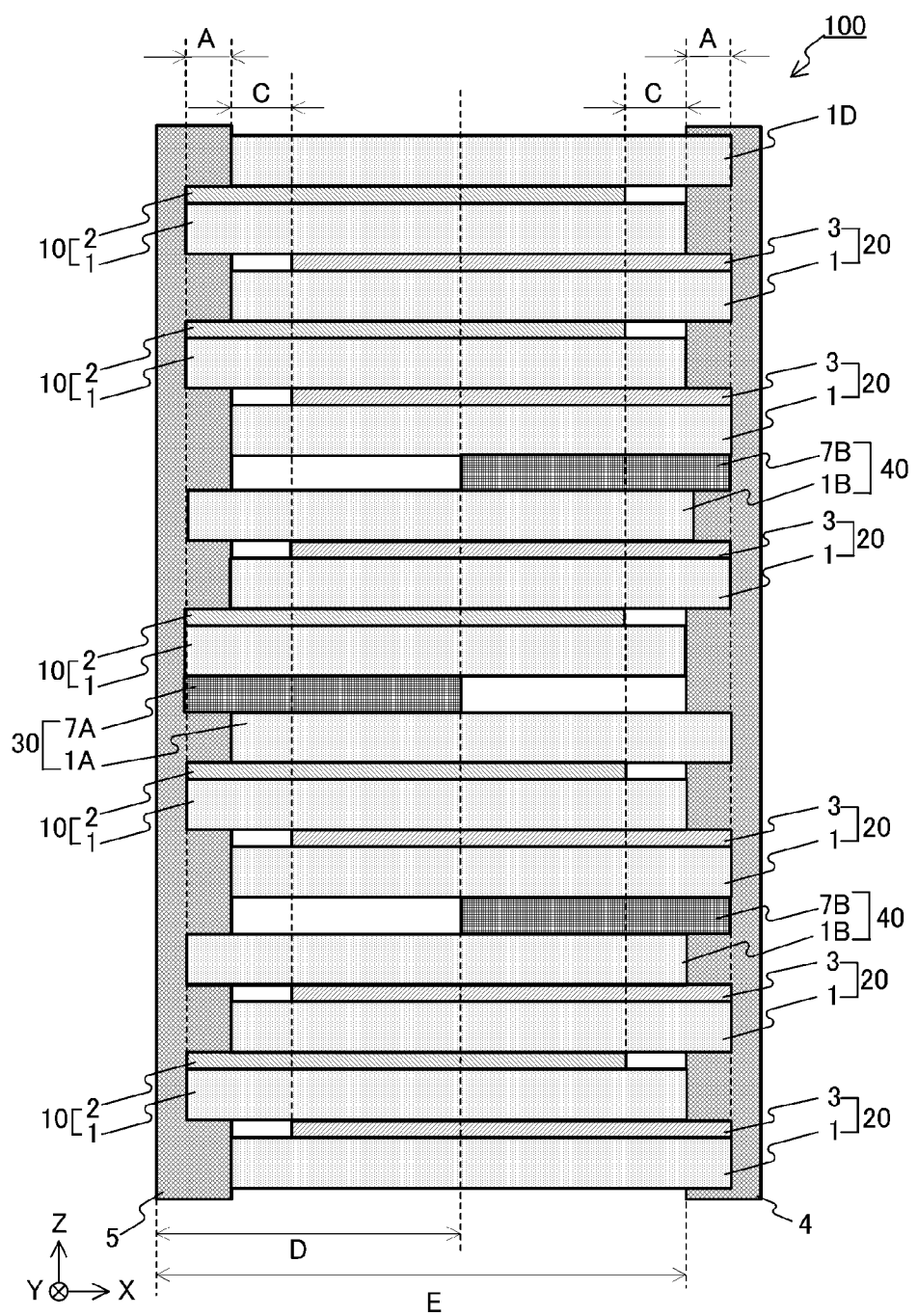
FIG. 2 is a cross-sectional view illustrating a P-P cross section of the film capacitor shown in FIG. 1.

The configuration of a laminated film capacitor 100 according to Embodiment 1 will be described with reference to FIGS. 1 and 2. The laminated film capacitor 100 includes: a laminated body formed by alternately stacking multiple layers of first films 10 and second films 20; and metallikon parts 4 and 5 formed on each of both end surfaces of the body. FIG. 2 shows a cross section of P-P shown in FIG. 1.

The first film 10 and the second film 20 are each, as shown in FIG. 2, composed of a dielectric film 1, and a first capacitance electrode 2 and second capacitance electrode 3 formed on surfaces of the dielectric film 1. It is to be noted that hatching indicating cross sections is omitted at the sites of the dielectric films 1 in FIG. 2, in order to facilitate discrimination from the other sites.

The dielectric films 1 are formed from a dielectric, for example, ceramics, polyethylene terephthalate, polypropylene, polyphenylene sulfide, polyethylene natphthalate, polystyrene, polycarbonate, mica, or the like. The dielectric films 1 are formed in the shape of a planar rectangle. The thickness thereof is, for example, on the order of several μm, and the width in the Y direction is several tens mm. The length E in the X direction is larger than the width, on the order of several tens mm to several hundreds mm.

The first capacitance electrodes 2 and the second capacitance electrodes 3 are composed of a metallic film of Al, Cu, Ag, or the like formed by vapor deposition or the like. The first capacitance electrodes 2 and the second capacitance electrodes 3 are 0.01 μm to 0.1 μm in thickness. The first capacitance electrodes 2 and the second capacitance electrodes 3 are formed in the shape of a planar rectangle, and both formed in the same size. The first capacitance electrodes 2 and the second capacitance electrodes 3 are formed in positions away from end edges of the dielectric films 1 in the ±Y direction. The first capacitance electrodes 2 cover the dielectric films 1 from positions at a distance C apart from end edges in the +X direction to end edges in the −X direction, whereas the second capacitance electrodes 3 cover the dielectric films 1 from positions at a distance C apart from the end edges in the −X direction to the end edges in the +X direction.

The first films 10 are stacked with end edges aligned with each other in the X and Y directions. Likewise, the second films 20 are also stacked with end edges aligned with each other in the X and Y directions. On the other hand, the first films 10 and the second films 20 are displaced just at a distance A in the X direction.

The metallikon parts 4 and 5 are formed by spraying a heated thermal spray material (for example, a metal) (by metallikon) onto end surfaces in the ±X directions of the laminated body of the first films 10 and second films 20 stacked. The metallikon part 4 covers, at the +X end surface of the laminated film capacitor 100, portions of the second capacitance electrodes 3 at the +X end edges of the second films 20, and the +X end edges of the first films 10, and makes an electrical connection in contact with the second capacitance electrodes 3. The metallikon part 5 covers, at the −X end surface of the laminated film capacitor 100, portions of the first capacitance electrodes 2 at the −X end edges of the first films 10, and the −X end edges of the second films 20, and makes an electrical connection in contact with the first capacitance electrodes 2. It is to be noted that the first capacitance electrodes 2, the second capacitance electrodes 3, and the metallikon parts 4 and 5 are emphatically drawn in FIG. 2 in order to facilitate discrimination from each other.

In the laminated film capacitor 100, a third film 30 and a fourth film 40 are inserted between the alternately stacked multiple first films 10 and second films 20. Specifically, the third film 30 is stacked between one first film 10 and another first film 10 adjacent to the first film 10 in the Z direction. Further, the fourth film 40 is stacked between one second film 20 and another second film 20 adjacent to the second film 20 in the Z direction. The third film 30 is composed of a dielectric film 1A and a heat dissipator 7A provided on the dielectric film 1A, whereas the fourth film 40 is composed of a dielectric film 1B and a heat dissipator 7B provided on the dielectric film 1B.

The heat dissipators 7A and 7B are structures that have higher heat dissipation performance than at least one of the first capacitance electrodes 2 and second capacitance electrodes 3. The heat dissipators 7A and 7B are formed from metal foil, and in the shape of a planar rectangle. The heat dissipators 7A and 7B have the same width in the Y direction as those of the first capacitance electrodes 2 and second capacitance electrodes 3, and also have the same position in the Y direction as those of the first capacitance electrode 2 and second capacitance electrode 3. The width D of the heat dissipators 7A and 7B in the X direction is nearly half of the width E of the first capacitance electrodes 2 and the second capacitance electrodes 3, and the heat dissipators 7A and 7B extend from the center of the capacitor 100 in the X direction respectively to the end edge thereof in the −X direction and the end edge thereof in the +X direction. The heat dissipators 7A and 7B are thicker than any one of the first capacitance electrodes 2 and second capacitance electrodes 3, and for example, on the order of several μm in thickness. Alternatively, the heat dissipators 7A and 7B have a lower (higher) thermal resistance (thermal conductivity) than that of any one of the first capacitance electrodes 2 and second capacitance electrodes 3, and for example, the thermal resistance of the heat dissipators 7A and 7B is 1/10 to 1/100 times as high as the thermal resistance of the metallic film. The heat dissipators 7A and 7B are exposed just by the distance A in the X direction respectively from the dielectric films 1A and 1B, and electrically and physically connected to the metallikon parts 4 and 5.

The dielectric films 1A and 1B are insulating films that have the same material and shape as the dielectric films 1 constituting the first film 10 and second film 20, placed between the first capacitance electrodes 2 and second capacitance electrodes 3 adjacent to the heat dissipators 7A and 7B in the −Z direction for electrical insulation.

A dielectric film 1D is a film that has the same material and shape as the dielectric films 1 constituting the first films 10 and second films 20, and placed on the +Z surface of the capacitor 100 for electrically insulating and protecting the first capacitance electrode 2 of the uppermost first film 10 from the outside.

In the thus configured laminated film capacitor 100, the third film 30 and fourth film 40 including the heat dissipators 7A and 7B are inserted between the stacked first films 10 and second films 20. The heat dissipators 7A and 7B are connected to the metallikon parts 4 and 5. Furthermore, the heat dissipators 7A and 7B have higher heat dissipation performance than any one of the first capacitance electrodes 2 and second capacitance electrodes 3, and the heat dissipators 7A and 7B are formed to be thicker than any one of the first capacitance electrodes 2 and second capacitance electrodes 3, or lower in thermal resistance (higher in thermal conductivity) than anyone of the first capacitance electrodes 2 and second capacitance electrodes 3. For this reason, the heat dissipators 7A and 7B are able to dissipate heat generated in the laminated film capacitor 100 to the outside of the laminated film capacitor 100 with higher efficiency than the first capacitance electrodes 2 and the second capacitance electrodes 3. For example, the heat dissipators 7A and 7B are lower in thermal resistance than the metallic film (e.g., deposited film), and thus higher in heat dissipation efficiency, as compared with conventional capacitors which dissipate heat from wound cores or capacitors which dissipate heat through deposited films of aluminum.

The heat dissipators 7A and 7B are electrically connected to the first capacitance electrodes 2 of the first films 10, or the second capacitance electrodes 3 of the second films 20, via the metallikon parts 4 and 5. The heat dissipators 7A and 7B are respectively connected to the metallikon parts 4 and 5, and the same voltages are applied to the dissipators respectively as those to the first capacitance electrodes 2 and the second capacitance electrodes 3. For this reason, the heat dissipators 7A and 7B will not disturb the electric field between one first film 10 and another adjacent first film 10, or between one second film 20 and another adjacent second film 20. As a result, the laminated film capacitor 100 has reliability improved.

The heat dissipators 7A and 7B extend from the center of the laminated film capacitor 100 in the X direction respectively to the end edge thereof in the −X direction and the end edge thereof in the +X direction. For this reason, the dissipators are able to dissipate heat near the center of the laminated film capacitor 100 to the both end surfaces of the laminated film capacitor 100 with high efficiency.

Embodiment 2

Figure 3:
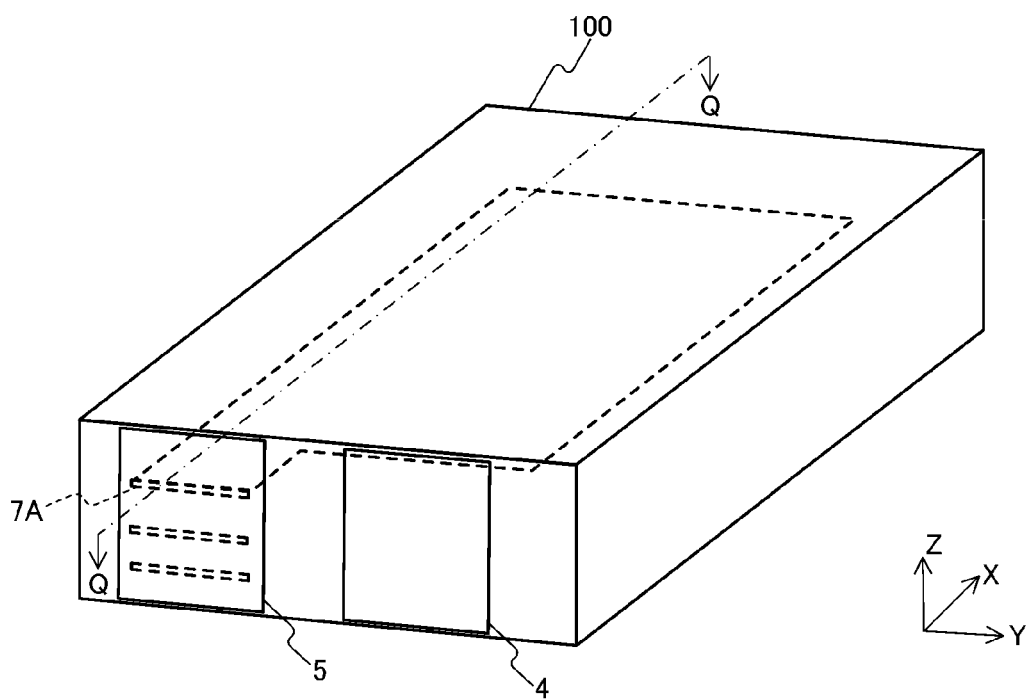
FIG. 3 is a perspective view illustrating a film capacitor according to Embodiment 2.

Next, the configuration of a laminated film capacitor 100 according to Embodiment 2 will be described with reference to FIGS. 3 and 4. The laminated film capacitor 100 according to Embodiment 2 is formed in the shape of a substantially cuboid, and metallikon parts 4 and 5 are formed on one end surface of the substantially cuboid shape (so-called one-sided electrode film capacitor). FIG. 4B shows a cross section of Q-Q shown in FIG. 3 and FIG. 4A. It is to be noted that hatching is omitted at the sites of the dielectric films 1 in FIG. 4 in cross section in order to facilitate discrimination from the other sites. Hereinafter, the configuration differing from Embodiment 1 will be mainly described.

Figure 4A:
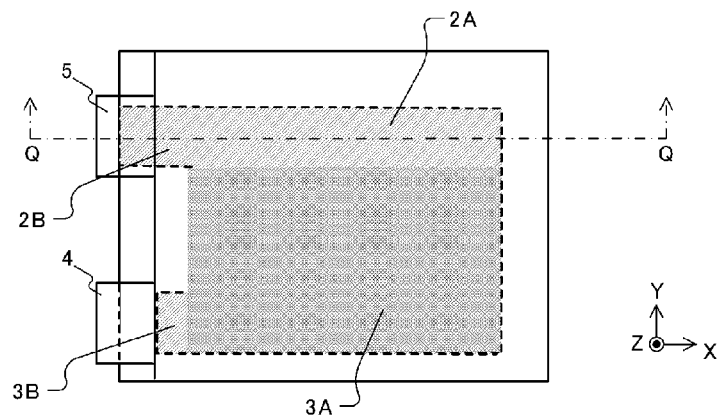
FIGS. 4A and 4B are respectively a plan view of, and a cross-sectional view illustrating a Q-Q cross section of the film capacitor shown in FIG. 3.
Figure 4B:
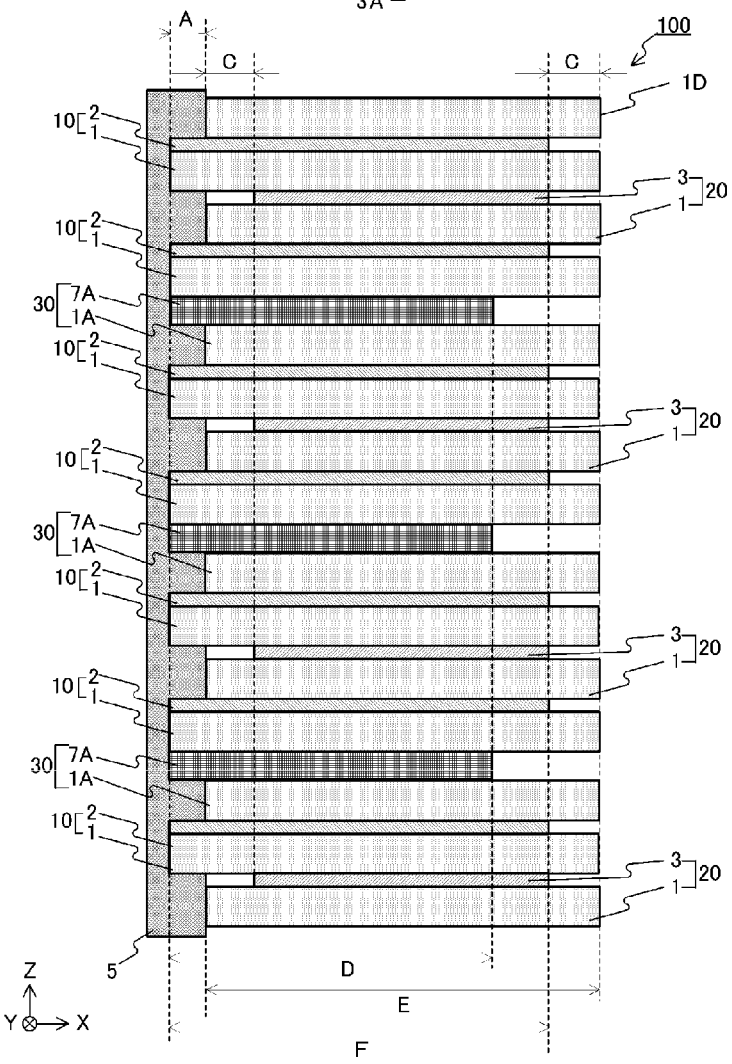

As shown in FIG. 4A, a first capacitance electrode 2 and a second capacitance electrode 3 are respectively composed of internal electrodes 2A and 3A and extraction parts 2B and 3B. The internal electrodes 2A and 3A are formed in the shape of a planar rectangle smaller than dielectric films 1, and located apart from end edges of the dielectric films 1 in the ±X direction and ±Y direction. The extraction parts 2B and 3B are formed in the shape of a planar rectangle, and the widths thereof in the Y direction are half or less than half of the widths of the internal electrodes 2A and 3A in the Y direction. The extraction parts 2B and 3B extend from the internal electrodes 2A and 3A to the −X end edges of the dielectric films 1, and make an electrical connection to the metallikon parts 4 and 5. When a voltage is applied to the metallikon parts 4 and 5, the extraction parts 2B and 3B applies the voltage to the internal electrodes 2A and 3A. The extraction part 2B is located more −Y than the extraction part 3B, and the extraction parts 2B and 3B have no overlap with each other in the Y direction. The extraction parts 2B and 3B are each placed in the same position in the Y direction, and lie in the Z direction.

The metallikon parts 4 and 5 are formed in the shape of a planar rectangle on the −X end surface of the laminated film capacitor 100. The metallikon parts 4 and 5 are each formed to have almost the same width in the Y direction respectively as the extraction parts 2B and 3B, and cover the −X end surface of the laminated film capacitor 100 from the −Z end edge to the +Z end edge.

In the laminated film capacitor 100, as shown in FIG. 4B, a third film 30 composed of a heat dissipator 7A and a dielectric film 1A is stacked between one first film 10 and another first film 10 adjacent to the first film 10 in the Z direction.

The heat dissipator 7A is composed of an inner region and an extraction part in the same manner as the first capacitance electrode 2. The inner region of the heat dissipator 7A is slightly smaller in the X direction than the internal electrode 2B of the first capacitance electrode 2, and the same size in the Y direction as the size of the internal electrode 2B. The whole length D of the heat dissipator 7A in the X direction is slightly smaller than the length F of the first capacitance electrode 2, and the heat dissipator 7A extends from almost the same position as the −X end edge of the first capacitance electrode 2 of the first film 10 to the +X side over the center of the first capacitance electrode 2. The heat dissipator 7A is displaced just at a distance A from the dielectric film 1A in the X direction at the −X end edge, with the displacement in electrical and physical contact with the metallikon part 5.

The dielectric film 1A is formed to have the same shape, size, and position as the dielectric film 1 of the second film 20, for ensuring insulation between the heat dissipator 7A and the first capacitance electrode 2.

In the laminated film capacitor 100 according to Embodiment 2, the third film 30 including the heat dissipator 7A is stacked between one first film 10 and another first film 10 adjacent to the first film 10. The heat dissipator 7A, which is connected to the metallikon part 5, extends from the −X end edge of the first capacitance electrode 2 of the first film 10 to the +X side over the center of the first capacitance electrode 2 in the X direction. For this reason, it is possible to dissipate heat generated in a +X position over the center of the first capacitance electrode 2 of the first film 10, to the −X end edge. The laminated film capacitor 100 with the metallikon parts 4 and 5 formed at one end surface of the capacitor is also able to dissipate heat with high efficiency.

Embodiment 3

Figure 5:
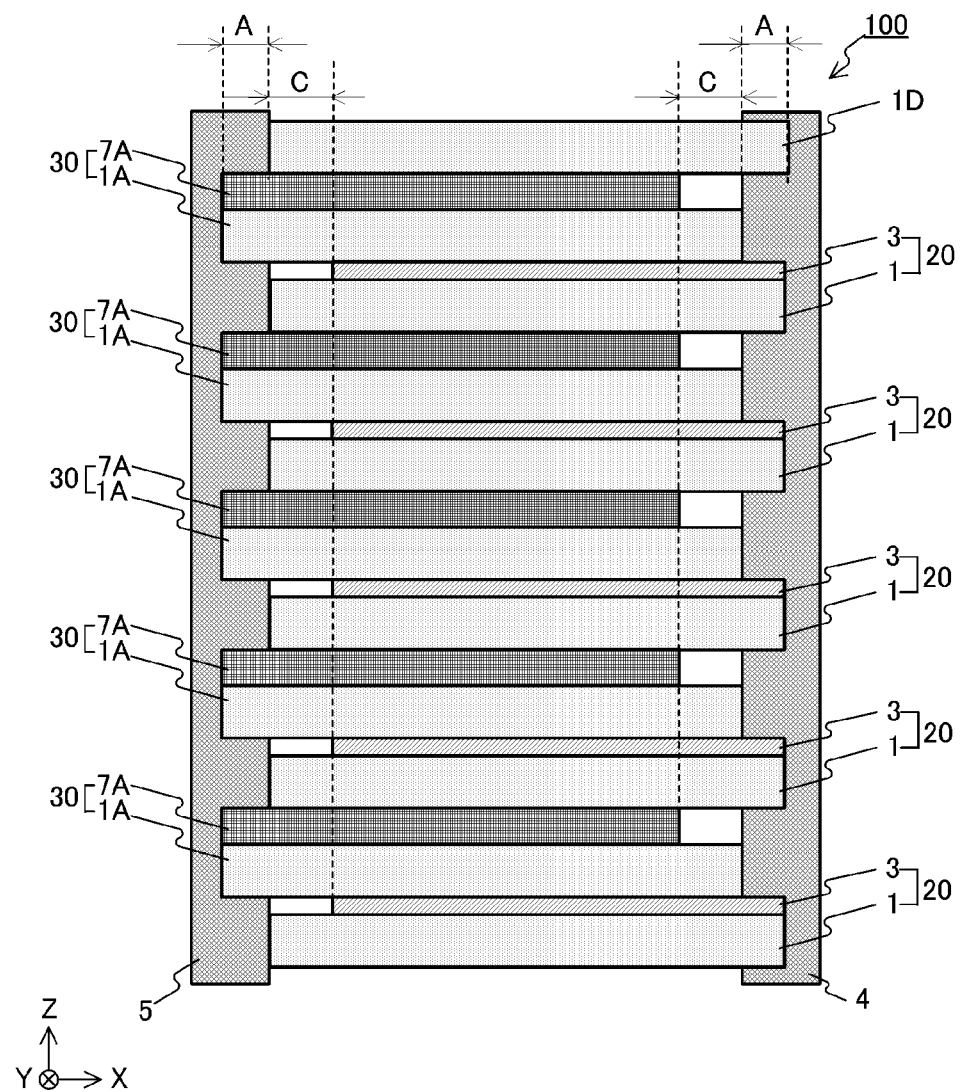
FIG. 5 is a cross-sectional view illustrating a film capacitor according to Embodiment 3.

Next, the configuration of a laminated film capacitor 100 according to Embodiment 3 will be described with reference to the cross-sectional view in FIG. 5. The laminated film capacitor 100 according to Embodiment 3 is composed of a laminated body with multiple third films 30 and second films 20 alternately stacked. The third films 30 are each composed of a heat dissipator 7A and a dielectric film 1A. It is to be noted that hatching indicating cross sections is omitted at the sites of the dielectric films 1 in FIG. 5, in order to facilitate discrimination from the other sites. Hereinafter, the configuration differing from Embodiments 1 and 2 will be mainly described.

The dielectric films 1A are formed from the same material as the dielectric films 1 of the first films 10 according to Embodiment 1. The dielectric films 1A are displaced just at a distance A from the second films 20 toward the −X side. The end edge locations of the dielectric films 1A are aligned with each other in the X direction.

The heat dissipators 7A are placed on the +Z surfaces of the dielectric films 1A. The heat dissipators 7A are placed so as to cover the dielectric films 1A from positions just at a distance C apart from the +X end edges to the −X end edges. At the −X end edges of the heat dissipators 7A, the +Z surfaces of the heat dissipators 7A are exposed from the second films 20. The end edge locations of the heat dissipators 7A are aligned with each other in the X direction. The heat dissipators 7A each have a −X end edge in contact with electrical and physical contact with a metallikon part 5.

In the laminated film capacitor 100 according to Embodiment 3, the third films 30 each composed of the heat dissipator 7A and the dielectric film 1A, and the second films 20 are alternately stacked multiple times, with the heat dissipators 7A each in contact with the metallikon part 5. When voltages that differ in polarity from each other are applied respectively to the metallikon parts 4 and 5, the heat dissipators 7A and second capacitance electrodes 3 function as internal electrodes (capacitance electrodes) of the capacitor. The heat dissipators 7A double as the internal electrodes of the capacitor, and the electric field in the laminated body will not be thus disturbed. For this reason, the laminated film capacitor 100 has favorable reliability.

Embodiment 4

Figure 6:
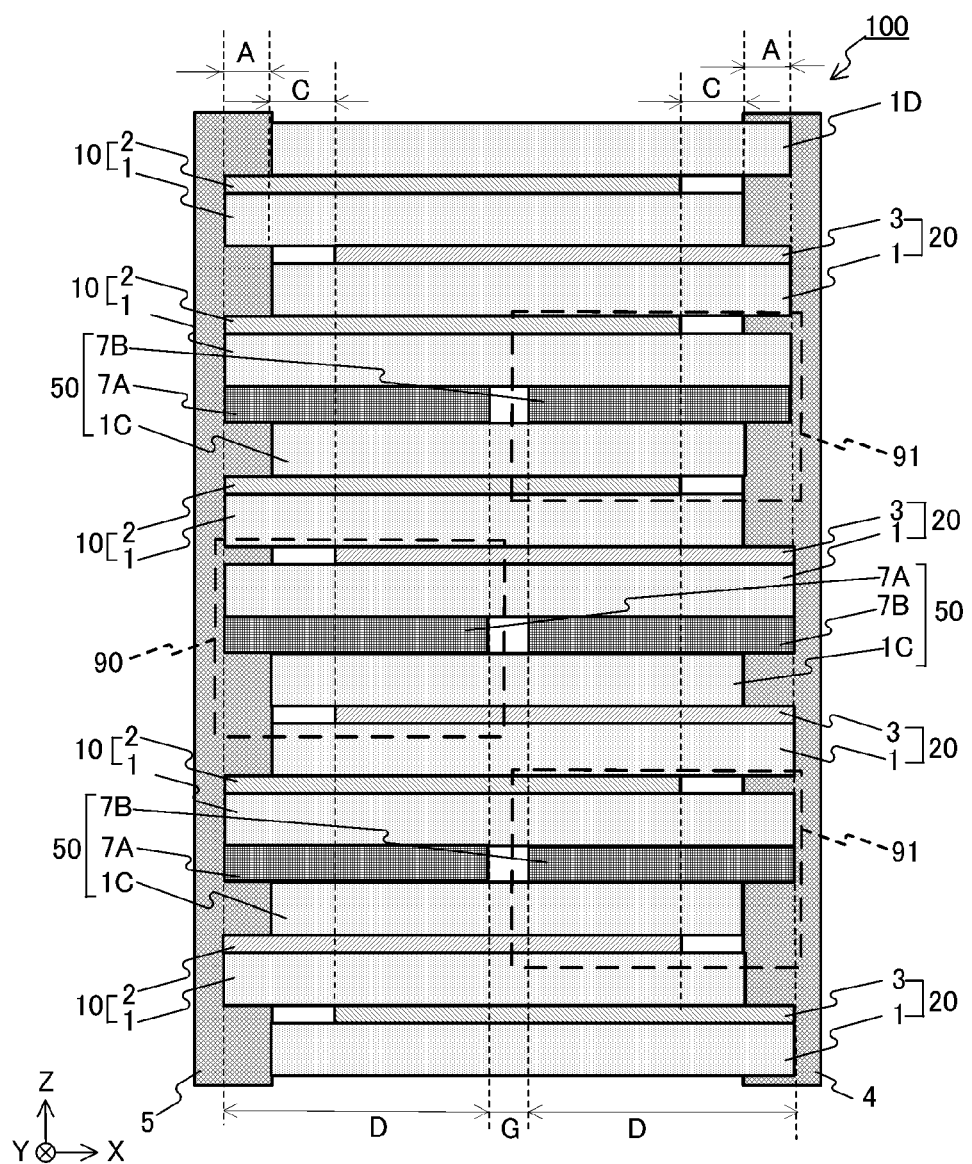
FIG. 6 is a cross-sectional view illustrating a film capacitor according to Embodiment 4.

Next, the configuration of a laminated film capacitor 100 according to Embodiment 4 will be described with reference to FIG. 6. The laminated film capacitor 100 according to Embodiment 4 has multiple first films 10 and second films 20 alternately stacked, and fifth films 50 are stacked between the first films 10 and 10, or between the second films 20 and 20. The fifth films 50 are each composed of a dielectric film 1C and heat dissipators 7A and 7B formed on the dielectric film 1C. It is to be noted that hatching indicating cross sections is omitted at the sites of the dielectric films 1 in FIG. 6, in order to facilitate discrimination from the other sites. Hereinafter, the configuration differing from Embodiments 1 to 3 will be mainly described.

The dielectric film 1C is formed to be smaller just by a distance 2A in the X direction than the first films 10 and the second films 20 which are adjacent to the +Z sides of the heat dissipators 7A and 7B. The +X end edge of the dielectric film 1C is positioned at the same location in the X direction as the +X end edges of the first films 10 which are not adjacent to the +Z sides of the heat dissipators, and the −X end edge of the dielectric film 1C is positioned at the same location in the X direction as the −X end edges of the second films 20 which are not adjacent to the +Z sides of the heat dissipators. The dielectric film 1C has end edges in the ±X directions in contact with metallikon parts 4 and 5.

The heat dissipators 7A and 7B are arranged at a distance G from each other in the X direction on the dielectric film 1C. The heat dissipators 7A and 7B are displaced just at a distance A respectively from the −X and +X end edges of the dielectric film 1C in the −X and +X directions. The heat dissipators 7A and 7B are respectively exposed from the dielectric film 1C at the −X and +X end edges, and electrically and physically connected to the metallikon parts 4 and 5.

The first films 10 and second films 20 adjacent to the +Z sides of the heat dissipators 7A and 7B extend to the −X end edges of the heat dissipators 7A and the +X end edges of the heat dissipators 7B, in order to support the heat dissipators 7A and 7B. Further, first capacitance electrodes 2 and second capacitance electrodes 3 adjacent to the heat dissipators 7A and 7B with dielectric films 1 interposed therebetween are brought into contact with the metallikon parts 4 and 5. The heat dissipator 7A in contact with the metallikon part 5 thus has electrostatic capacitance between the dissipator and the second capacitance electrodes 3 in contact with the metallikon part 4 (a region 90 shown in FIG. 6). On the other hand, the heat dissipator 7B in contact with the metallikon part 4 thus has electrostatic capacitance between the dissipator and the first capacitance electrodes 2 in contact with the metallikon part 5 (a region 91 shown in FIG. 6).

In the laminated film capacitor 100 according to Embodiment 4, the heat dissipators 7A and 7B are placed in line, and the heat dissipators 7A and 7B are respectively brought into contact with the metallikon parts 4 and 5 at the −X and +X end edges. For this reason, the laminated film capacitor 100 is able to dissipate heat generated within the laminated film capacitor 100 from each of the end edges in the ±X directions, and higher in heat dissipation efficiency than heat dissipators which dissipate heat to the +X side or −X side.

In the laminated film capacitor 100, the heat dissipators 7A and 7B have electrostatic capacitance respectively between the dissipator and the first capacitance electrodes 2 and between the dissipator and the second capacitance electrodes 3. In the laminated film capacitor 100, the heat dissipators 7A and 7B function as parts of internal electrodes.

Embodiment 5

Figure 7A:
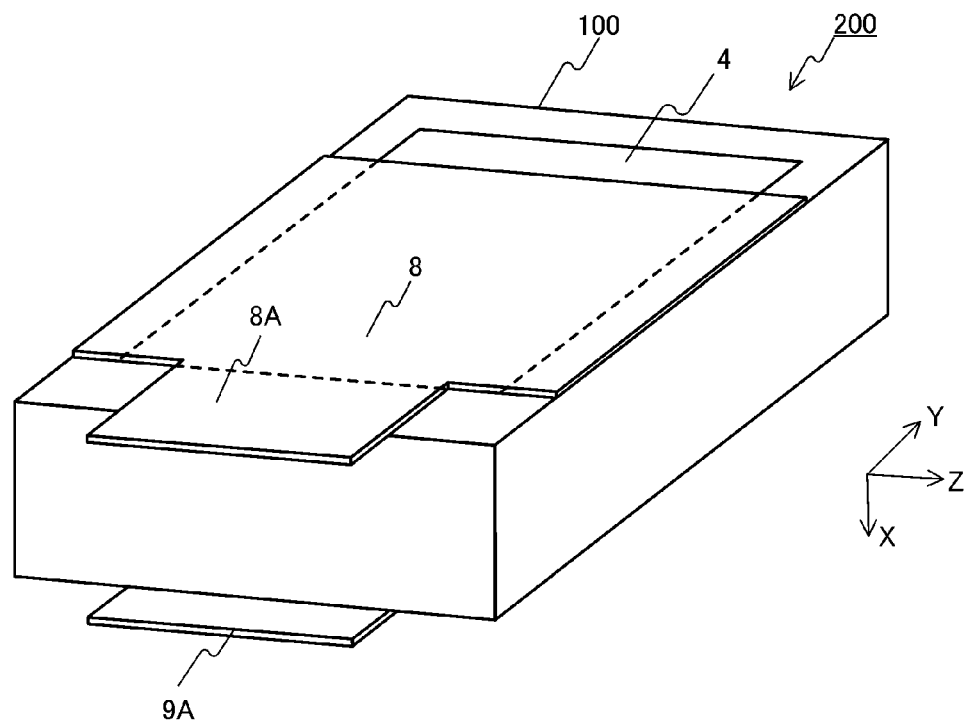
FIGS. 7A and 7B are perspective views of a film capacitor module according to Embodiment 5.
Figure 7B:
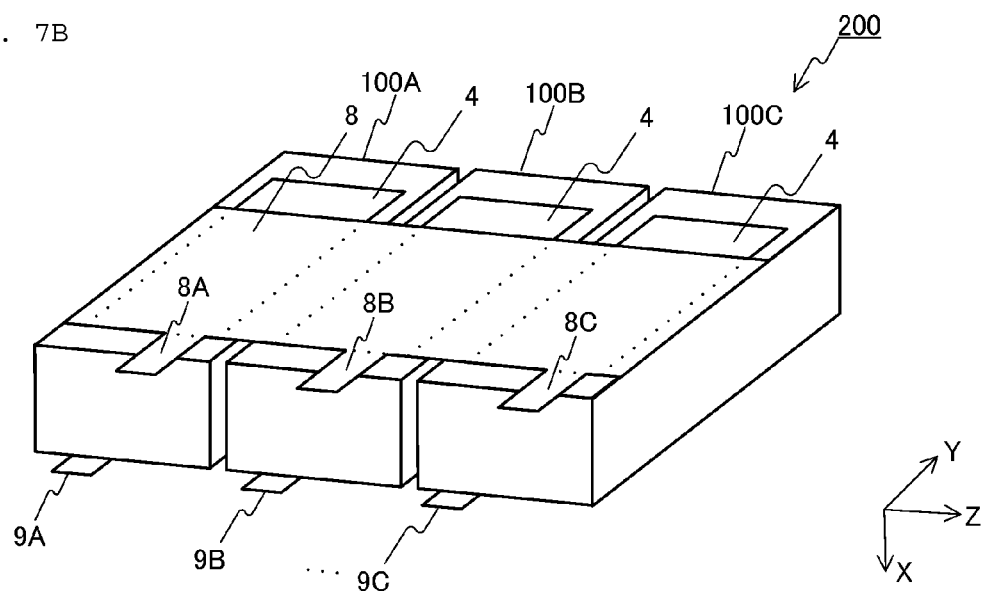
Figure 8A:
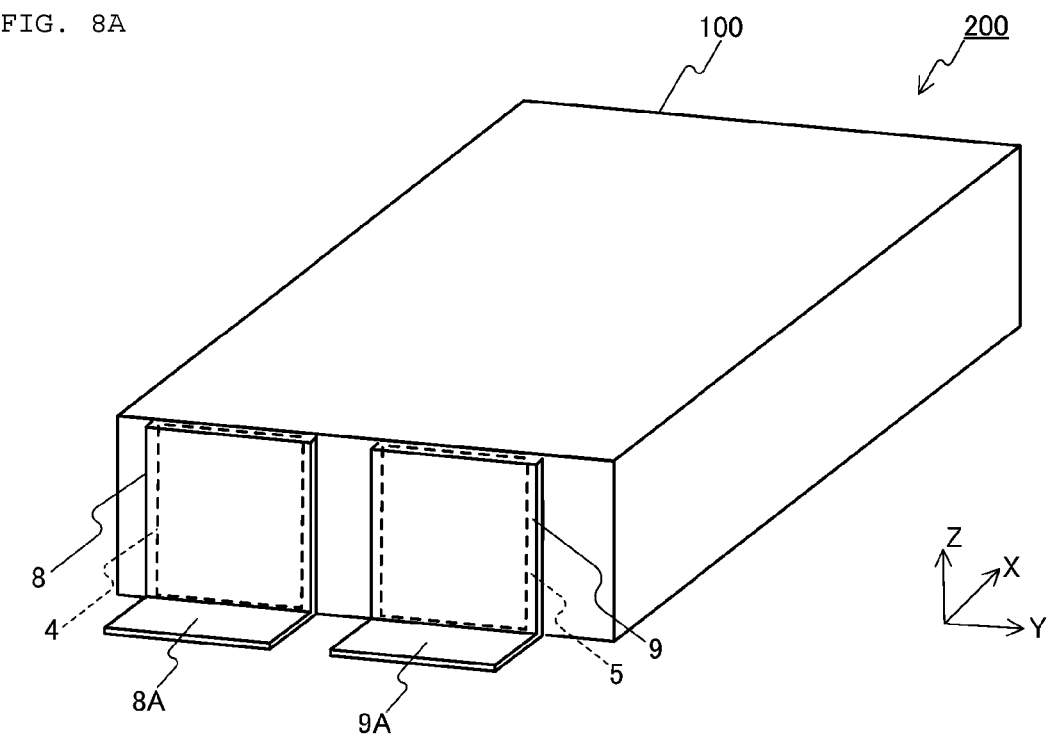
FIGS. 8A and 8B are perspective views of a film capacitor module according to Embodiment 5.
Figure 8B:
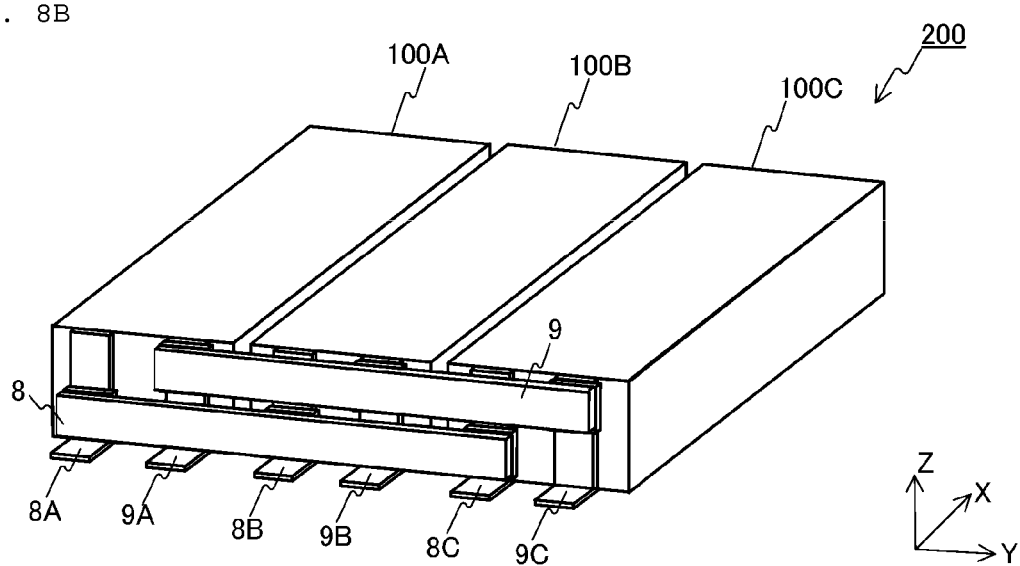

Next, the configuration of a capacitor module 200 according to Embodiment 5 will be described with reference to FIGS. 7 and 8. Embodiment 5 of the invention provides the capacitor module 200 composed of the laminated film capacitor 100 according to Embodiment 1 or 2. The capacitor module 200 shown in FIGS. 7A and 7B is composed of the laminated film capacitor 100 according to Embodiment 1 and bus bar electrodes 8 and 9. The capacitor module 200 shown in FIGS. 8A and 8B is composed of the laminated film capacitor 100 according to Embodiment 2 and bus bar electrodes 8 and 9. In the capacitor module 200 shown in FIGS. 7A and 7B, the bus bar electrodes 8 and 9 are placed on end edges of the laminated film capacitor 100 in the ±X directions, and in contact with metallikon parts 4 and 5. The bus bar electrodes 8 and 9 are provided respectively with bus bar electrode terminals 8A to 8C and 9A to 9C extending in the −Y direction for connections to external electronic components. Further, in the capacitor module 200 shown in FIGS. 8A and 8B, the bus bar electrodes 8 and 9 are placed on an end edge of the laminated film capacitor 100 in the −X direction. The bus bar electrodes 8 and 9 have bus bar electrode terminals 8A to 8C and 9A to 9C extending in the −X direction.

In the capacitor modules 200 according to Embodiment 5 of the present invention, the laminated film capacitors 100 have the heat dissipators 7A and 7B. Because of the heat dissipators 7A and 7B in contact with the bus bar electrodes 8 and 9 with the metallikon parts 4 and 5 interposed therebetween, the capacitor modules 200 are unlikely to have heat accumulated within the modules.

Embodiment 6

Figure 9:
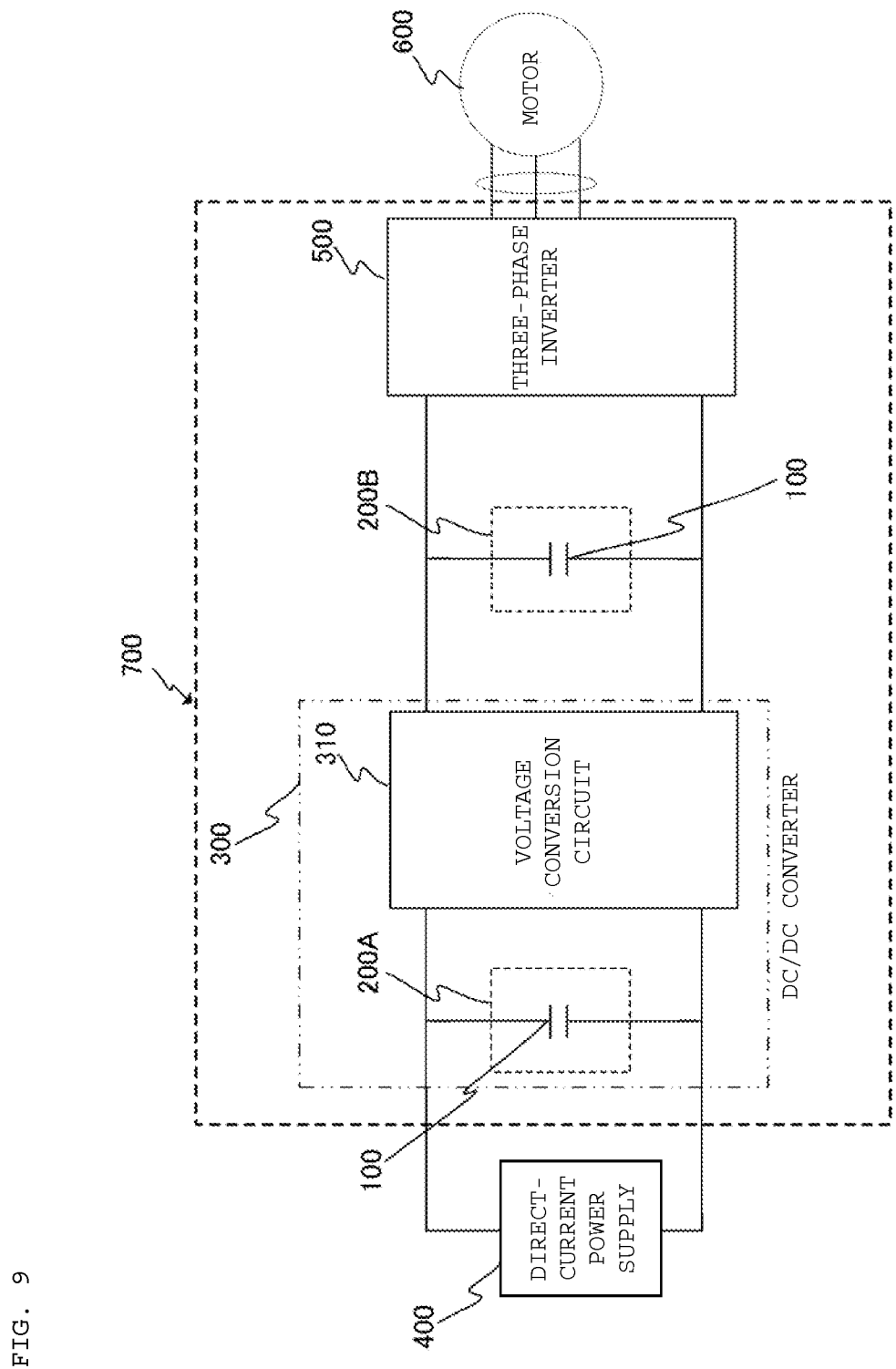
FIG. 9 is a circuit diagram of a power conversion system according to Embodiment 6.

Next, a power conversion system 700 according to Embodiment 6 will be described with reference to FIG. 9. Embodiment 6 of the present invention provides the power conversion system 700 which uses any laminated film capacitor 100 selected from those according to Embodiments 1 to 4. As shown in FIG. 9, the power conversion system 700 includes a direct-current power supply 400, a DC/DC converter 300, a DC-link capacitor 200B, and a three-phase inverter 500. The DC/DC converter 300 includes an input capacitor 200A and a voltage conversion circuit 310.

The direct-current power supply 400 is, for example, a secondary battery.

When direct-current power is supplied from the direct-current power supply 400, the DC/DC converter 300 inputs a direct-current voltage through the input capacitor 200A, increases the voltage by the voltage conversion circuit 310, and outputs the increased voltage. The input capacitor 200A is a smoothing capacitor for reducing surge superimposed on the direct-current voltage supplied from the direct-current power supply 400, and composed of the laminated film capacitor 100.

The increased direct-current voltage as the output of the DC/DC converter 300 is applied to the three-phase inverter 500 via the DC-link capacitor 200B. The DC-link capacitor 200B is a smoothing capacitor for reducing surge superimposed on the direct-current voltage output from the DC/DC converter 300, and composed of the laminated film capacitor 100. The three-phase inverter 500 converts the input direct-current power to three-phase alternating-current power, and outputs the power. The output three-phase alternating-current power is supplied to a motor 600 via a three-phase power supply line.

On the other hand, when three-phase alternating-current power is input which is generated with the rotation of the motor 600 such as due to the motor 600 braked, the inverter 500 converts the input three-phase alternating-current power to direct-current power, and outputs the power to the DC-link capacitor 200B. The DC-link capacitor 200B removes a ripple component of the direct-current voltage output from the three-phase inverter 500.

Then, the DC/DC converter 300 decreases the direct-current voltage output from the inverter 500 by the voltage conversion circuit 310, and smoothes the decreased direct-current voltage by the input capacitor 200A. Then, the DC/DC converter 300 supplies the direct-current power to the direct-current power supply 400 to charge the direct-current power supply 400.

Figure 10:
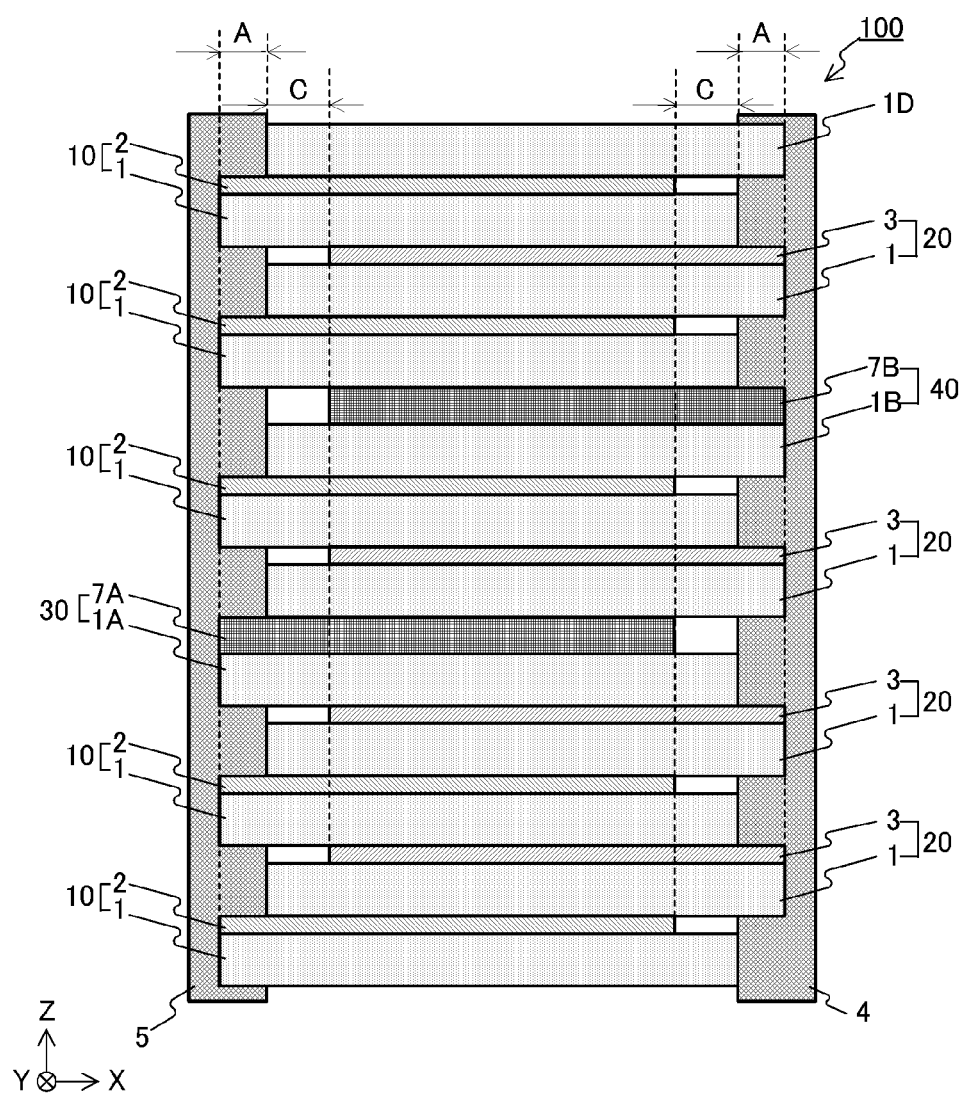
FIG. 10 is a cross-sectional view illustrating a modification example of a heat dissipator.

While the embodiments of the present invention have been described above, the present invention is not to be considered limited by the embodiments described above and the like. For example, in the laminated film capacitor 100 according to Embodiment 3, the third films 30 each composed of the heat dissipator 7A and the dielectric film 1A, and the second films 20 are alternately stacked multiple times. However, there is no need for all of the films stacked to include therein the heat dissipators 7A and 7B in the laminated film capacitor 100. As shown in FIG. 10, in a laminated film capacitor 100 with multiple first films 10 and second films 20 alternately stacked, some of the first films 10 may be replaced by a third film 30 composed of a heat dissipator 7A and a dielectric film 1A. In addition, as shown in FIG. 10, some of the second films 20 may be replaced by a fourth film 40 composed of a heat dissipator 7B and a dielectric film 1B.

Figure 11:
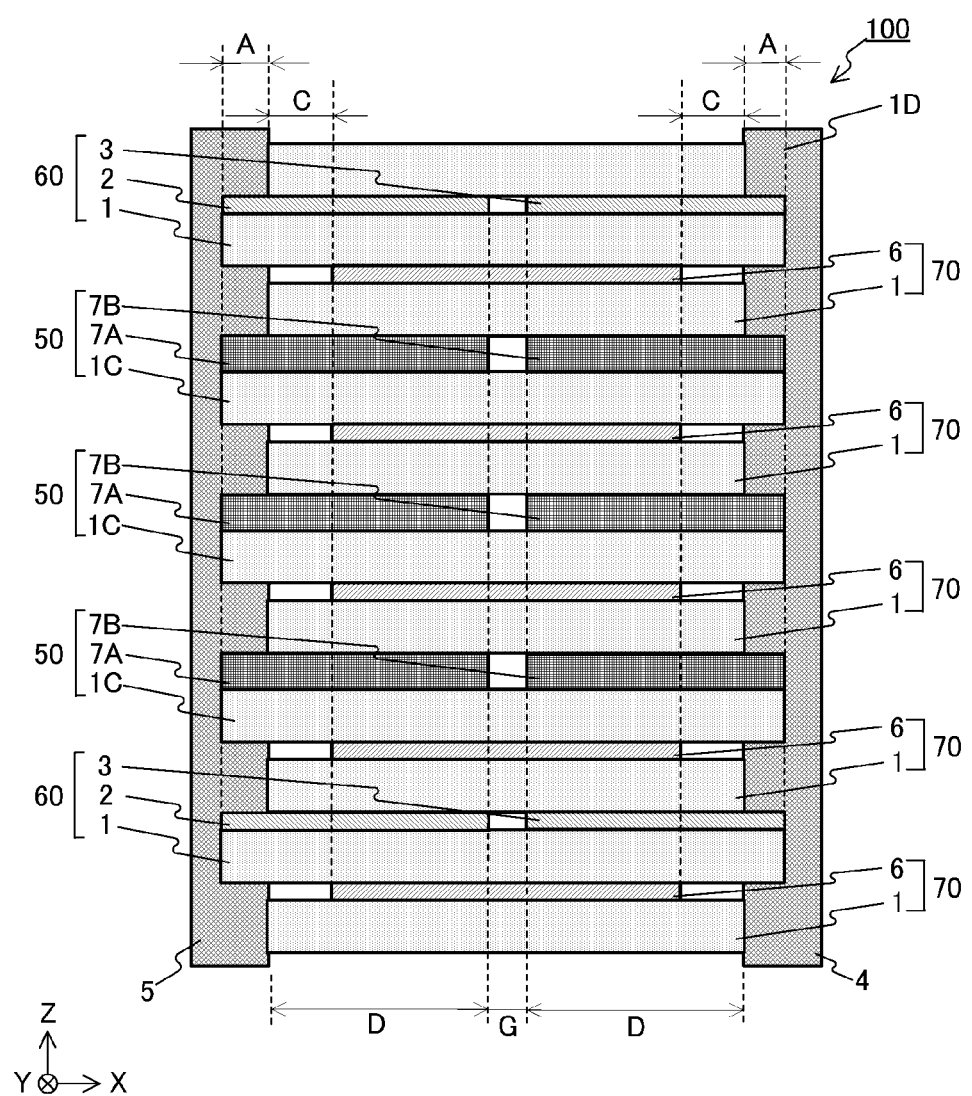
FIG. 11 is a cross-sectional view illustrating a modification example of a heat dissipator.
Figure 12:
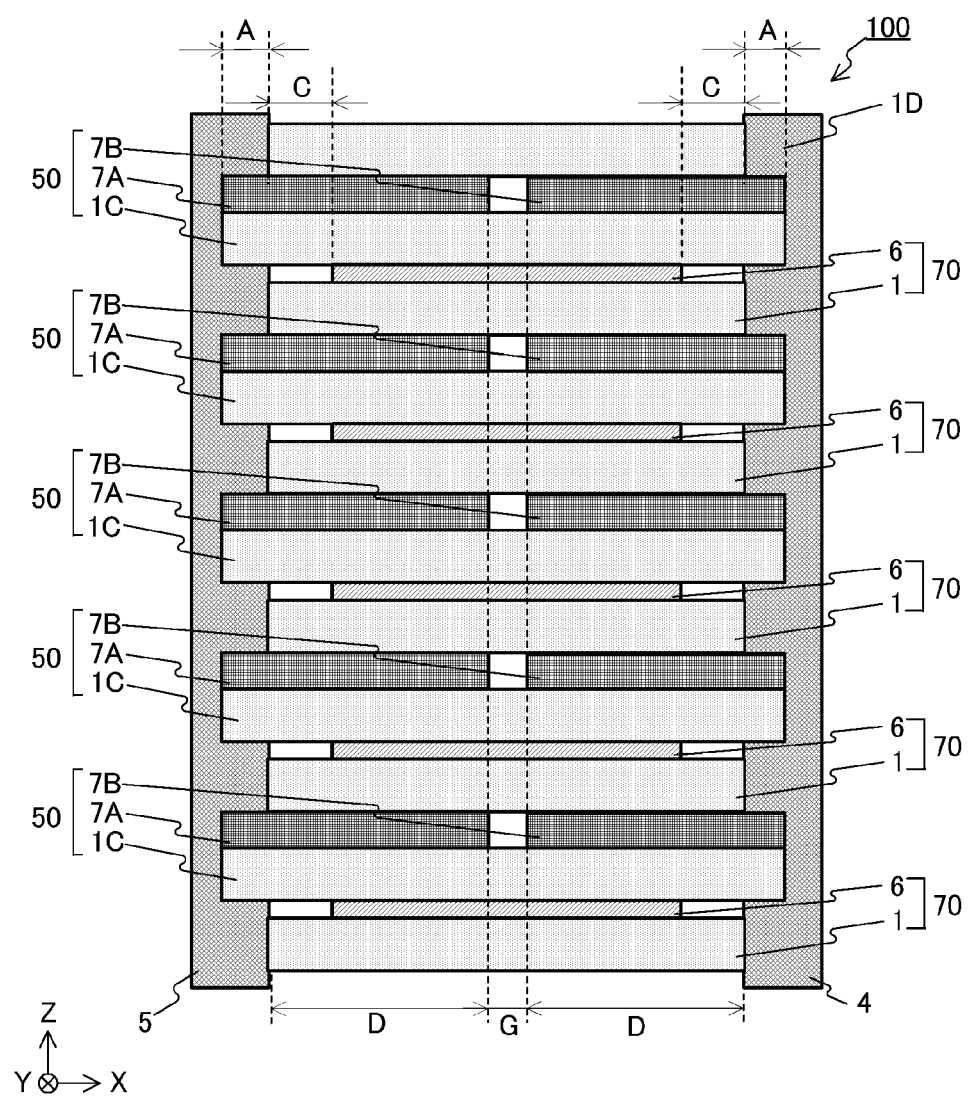
FIG. 12 is a cross-sectional view illustrating a modification example of a heat dissipator.

Furthermore, in the embodiments described above, the first films 10 and second films 20 respectively have one first capacitance electrode 2 and one second capacitance electrode 3, but the first films 10 and the second films 20 may have more than one capacitance electrode. For example, the laminated film capacitor 100 may have, as shown in FIG. 11, films 60 each with a first capacitance electrode 2 and a second capacitance electrode 3 arranged in line in the X direction and films 70 each with a third capacitance electrode 6 formed in the center in the X direction to be opposed to portions of the first capacitance electrode 2 and second capacitance electrode 3 in the Z direction, which are alternately stacked for multiple layers. In the present invention, in such a laminated film capacitor 100, the film 60 may be replaced by stacking a fifth film 50 composed of heat dissipators 7A and 7B and a dielectric film 1C. For example, as shown in FIG. 12, all of the films 60 in the laminated film capacitor 100 shown in FIG. 11 may be replaced by stacking fifth films 50 each composed of heat dissipators 7A and 7B and a dielectric film 1C.

Furthermore, while the heat dissipators 7A and 7B are formed from metal foil in the embodiments described above, the heat dissipators 7A and 7B are not limited to the metal foil. What is required in the present invention is that the heat dissipators 7A and 7B have higher heat dissipation performance than at least one of the first capacitance electrodes 2 and second capacitance electrodes 3. For example, the dissipators may be formed from an insulating material. What is required is that the heat dissipators 7A and 7B are, for example, larger in thickness or lower in thermal resistance than at least one of the first capacitance electrodes 2 and second capacitance electrodes 3 (for example, deposited films).

What is claimed is:

1. A laminated film capacitor comprising:
a laminated body having stacked first capacitance electrodes and second capacitance electrodes opposed to each other with first dielectric films interposed therebetween;
a first external electrode electrically connected to the first capacitance electrodes;
a second external electrode electrically connected to the second capacitance electrodes; and
a heat dissipator within the laminated body, positioned between at least one of a first pair of opposed, consecutively arranged first electrodes of the first capacitance electrodes and a second pair of opposed, consecutively arranged second electrodes of the second capacitance electrodes, connected to one of the first external electrode and the second external electrode, higher in heat dissipation performance than at least one of the first capacitance electrodes and the second capacitance electrodes, and larger in thickness than at least one of the first capacitance electrodes and the second capacitance electrodes.

2. The laminated film capacitor according to claim 1, wherein the first capacitance electrodes and the second capacitance electrodes are deposited metal films.

3. The laminated film capacitor according to claim 1, wherein the heat dissipator is opposed to a second capacitance electrode of the second capacitance electrodes with a second dielectric film interposed therebetween, and connected to the second capacitance electrodes.

4. The laminated film capacitor according to claim 1, wherein the heat dissipator is opposed to a second capacitance electrode of the second capacitance electrodes with a second dielectric film interposed therebetween, comprises a conductor, and is connected to the first capacitance electrodes.

5. The laminated film capacitor according to claim 1, wherein the first external electrode and the second external electrode are metallikon electrodes.

6. The laminated film capacitor according to claim 1, wherein the heat dissipator extends from a center of the laminated film capacitor to the end edge thereof.

7. A film capacitor module comprising:
the laminated film capacitor according to claim 1; and
a connection electrode connected to at least one of the first external electrode and the second external electrode.

8. The film capacitor module according to claim 7, further comprising:
an external circuit connected to the connection electrode.

9. A power conversion system comprising the laminated film capacitor according to claim 1, the laminated film capacitor being configured as a smoothing capacitor that reduces surge superimposed on a direct-current voltage so as to convert one of direct-current power and alternating-current power to the other.

10. A laminated film capacitor comprising:
a laminated body having stacked first capacitance electrodes and second capacitance electrodes opposed to each other with first dielectric films interposed therebetween;
a first external electrode electrically connected to the first capacitance electrodes;
a second external electrode electrically connected to the second capacitance electrodes; and
a heat dissipator within the laminated body, positioned between at least one of a first pair of opposed, consecutively arranged first electrodes of the first capacitance electrodes and a second pair of opposed, consecutively arranged second electrodes of the second capacitance electrodes, connected to one of the first external electrode and the second external electrode, higher in heat dissipation performance than at least one of the first capacitance electrodes and the second capacitance electrodes, and lower in thermal resistance than at least one of the first capacitance electrodes and the second capacitance electrodes.

11. The laminated film capacitor according to claim 10, wherein the first capacitance electrodes and the second capacitance electrodes are deposited metal films.

12. The laminated film capacitor according claim 10, wherein the heat dissipator is opposed to a second capacitance electrode of the second capacitance electrodes with a second dielectric film interposed therebetween, and connected to the second capacitance electrodes.

13. The laminated film capacitor according to claim 10, wherein the heat dissipator is opposed to a second capacitance electrode of the second capacitance electrodes with a second dielectric film interposed therebetween, comprises a conductor, and is connected to the first capacitance electrodes.

14. The laminated film capacitor according to claim 10, wherein the first external electrode and the second external electrode are metallikon electrodes.

15. The laminated film capacitor according to claim 10, wherein the heat dissipator extends from a center of the laminated film capacitor to the end edge thereof.

16. A film capacitor module comprising:
the laminated film capacitor according to claim 10; and
a connection electrode connected to at least one of the first external electrode and the second external electrode.

17. The film capacitor module according to claim 16, further comprising:
an external circuit connected to the connection electrode.

18. A power conversion system comprising:
the laminated film capacitor according claim 10, the laminated film capacitor being configured as a smoothing capacitor that reduces surge superimposed on a direct-current voltage so as to convert one of direct-current power and alternating-current power to the other.

* * * * *